United States Patent
Weintraub et al.

(10) Patent No.: US 6,804,640 B1
(45) Date of Patent: Oct. 12, 2004

(54) SIGNAL NOISE REDUCTION USING MAGNITUDE-DOMAIN SPECTRAL SUBTRACTION

(75) Inventors: Mitchel Weintraub, Fremont, CA (US); Francoise Beaufays, Palo Alto, CA (US)

(73) Assignee: Nuance Communications, Menlo Park, CA (US)

( * ) Notice: Subject to any disclaimer, the term of this patent is extended or adjusted under 35 U.S.C. 154(b) by 0 days.

(21) Appl. No.: 09/515,252

(22) Filed: Feb. 29, 2000

(51) Int. Cl.[7] .................. G10L 15/20; G10L 21/02
(52) U.S. Cl. ............... 704/226; 704/233; 381/94.3
(58) Field of Search .................. 704/224, 225, 704/226, 227, 228, 205, 233; 381/94.1, 94.2, 94.3, 94.7

(56) References Cited

U.S. PATENT DOCUMENTS

| | | | | |
|---|---|---|---|---|
| 4,630,304 A | * | 12/1986 | Borth et al. | 381/94.3 |
| 4,811,404 A | * | 3/1989 | Vilmur et al. | 381/94.3 |
| 4,897,878 A | * | 1/1990 | Boll et al. | 704/233 |
| 5,604,839 A | * | 2/1997 | Acero et al. | 704/224 |
| 5,668,927 A | * | 9/1997 | Chan et al. | 704/214 |
| 5,684,921 A | * | 11/1997 | Bayya et al. | 704/226 |
| 5,692,103 A | * | 11/1997 | Lockwood et al. | 704/233 |
| 5,737,407 A | | 4/1998 | Graumann | |
| 5,742,927 A | * | 4/1998 | Crozier et al. | 704/209 |
| 5,806,025 A | * | 9/1998 | Vis et al. | 704/226 |
| 5,943,429 A | * | 8/1999 | Handel | 381/94.2 |
| 5,950,154 A | * | 9/1999 | Medaugh et al. | 704/226 |
| 5,963,899 A | * | 10/1999 | Bayya et al. | 704/226 |

(List continued on next page.)

FOREIGN PATENT DOCUMENTS

| | | | |
|---|---|---|---|
| EP | 0 534 837 | * | 3/1993 |
| WO | WO 99/14738 | * | 3/1999 |

OTHER PUBLICATIONS

Lockwood et al., "Experiments with a Nonlinear Spectral Subtractor (NSS), Hidden Markov Models and the projection, for robust speech recognition in cars," Jun. 1992, Speech Communication 11 (1992), Nos. 2–3, pp. 215–228.*

Kuo–Guan Wu, "Efficient speech enhancement using spectral subtraction for car hands–free applications," International Conference on Consumer Electronics, 2001, Jun. 19–21, 2001, pp. 220 to 221.*

Steven F. Boll, "Suppression of Noise in Speech Using the Saber Method," IEEE International Conference on Acoustics, Speech and Signal Processing, 1978, pp. 606–609.

M. Berouti, et al., "Enhancement of Speech Corrupted by Acoustic Noise," Proceedings, IEEE Conference on Acoustics, Speech and Signal Processing, pp. 208–211, Apr. 1979.

*Primary Examiner*—Richemond Dorvil
*Assistant Examiner*—Martin Lerner
(74) *Attorney, Agent, or Firm*—Blakely, Sokoloff, Taylor & Zafman LLP

(57) ABSTRACT

A method and apparatus for generating a noise-reduced feature vector representing human speech are provided. Speech data representing an input speech waveform are first input and filtered. Spectral energies of the filtered speech data are determined, and a noise reduction process is then performed. In the noise reduction process, a spectral magnitude is computed for a frequency index of multiple frequency indexes. A noise magnitude estimate is then determined for the frequency index by updating a histogram of spectral magnitude, and then determining the noise magnitude estimate as a predetermined percentile of the histogram. A signal-to-noise ratio is then determined for the frequency index. A scale factor is computed for the frequency index, as a function of the signal-to-noise ratio and the noise magnitude estimate. The noise magnitude estimate is then scaled by the scale factor. The scaled noise magnitude estimate is subtracted from the spectral magnitudes of the filtered speech data, to produce cleaned speech data, based on which a feature vector is generated.

8 Claims, 5 Drawing Sheets

U.S. PATENT DOCUMENTS 6,098,038 A * 8/2000 Hermansky et al. ........ 704/226
6,266,633 B1 * 7/2001 Higgins et al. ............. 704/224
6,317,709 B1 * 11/2001 Zack ......................... 381/94.3
6,336,090 B1 * 1/2002 Chou et al. ................. 704/231
6,349,278 B1 * 2/2002 Krasny et al. ............... 704/226
6,351,731 B1 * 2/2002 Anderson et al. ........... 704/225
6,477,489 B1 * 11/2002 Lockwood et al. ...... 704/200.1
6,671,667 B1 * 12/2003 Chandran et al. ........... 704/233

* cited by examiner

SIGNAL NOISE REDUCTION USING MAGNITUDE-DOMAIN SPECTRAL SUBTRACTION

FIELD OF THE INVENTION

The present invention pertains to techniques for reducing noise in a signal. More particularly, the present invention relates to techniques for reducing noise in a signal representing speech.

BACKGROUND OF THE INVENTION

In a speech recognition system, the presence of noise in an input speech signal can degrade recognition accuracy. Noise can be introduced from many different sources and may be introduced through either acoustic coupling or electrical coupling. Acoustic coupling of noise into a speech signal might occur when a speaker is located in a noisy setting, such as a busy office environment. Electrical coupling of noise may result from electromagnetic radiation emitted by electrical devices in proximity to components of the speech recognition system. Various techniques are known for reducing noise in a speech signal. However, these techniques generally are not adaptable, or are not sufficiently adaptable, to the amount of noise in the speech signal at any given time. A typical consequence of this shortcoming is that a given noise reduction technique may perform adequately in a noisy environment but perform poorly in a low-noise environment. Such techniques, therefore, tend not to be very flexible in terms of handling signals under a variety of conditions. In addition, prior art noise reduction techniques may not be capable of operating upon individual frequency components of a signal. Furthermore, many noise reduction techniques used in speech recognition handle the beginning of a sentence very inefficiently, since few samples have been observed at that point in time, and a signal-to-noise ratio is difficult to estimate accurately at that time.

SUMMARY OF THE INVENTION

The present invention includes a method and apparatus for reducing noise in data representing an audio signal, such as a speech signal. For each of multiple frequency components of the audio signal, a spectral magnitude of the data and an estimate of noise in the data are computed. The estimate of noise is scaled by a noise scale factor that is a function of the corresponding frequency component, to produce a scaled noise estimate. The scaled noise estimate is subtracted from the spectral magnitude to produce cleaned audio data. The scale factor may be also be a function of an absolute noise level for each frequency component, a signal-to-noise ratio for each frequency component, or both.

The noise reduction technique operates well on both noisy input signals and clean input signals. The technique can be implemented as a real-time method of reducing noise in a speech signal, which begins the noise reduction process immediately when the speech signal becomes available, thereby reducing undesirable delay between production of the speech signal and its recognition by a speech recognizer.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for reducing noise in a speech signal are described. The noise reduction technique operates well on either noisy speech or clean speech. As will be described in greater detail below, in the noise reduction technique, a noise magnitude estimate is determined for each of multiple frequency indexes by updating a histogram of spectral magnitude, and determining the noise magnitude estimate as a predetermined percentile of the histogram. A signal-to-noise ratio is also determined for each frequency index. A scale factor is computed for each frequency index as a function of the signal-to-noise ratio and the noise magnitude estimate. The noise magnitude estimate is then scaled by the scale factor, and the scaled noise magnitude estimate is subtracted from the spectral magnitude of the noisy speech, to produce cleaned speech data. The technique can be implemented as a real-time method of reducing noise, which begins the noise reduction process immediately when the speech signal becomes available, thereby reducing undesirable delay between production of the speech signal and its recognition by a speech recognizer.

Note that in this description, references to "one embodiment" or "an embodiment" mean that the feature being referred to is included in at least one embodiment of the present invention. Further, separate references to "one embodiment" in this description do not necessarily refer to the same embodiment, however, neither are such embodiments mutually exclusive.

Figure 1:
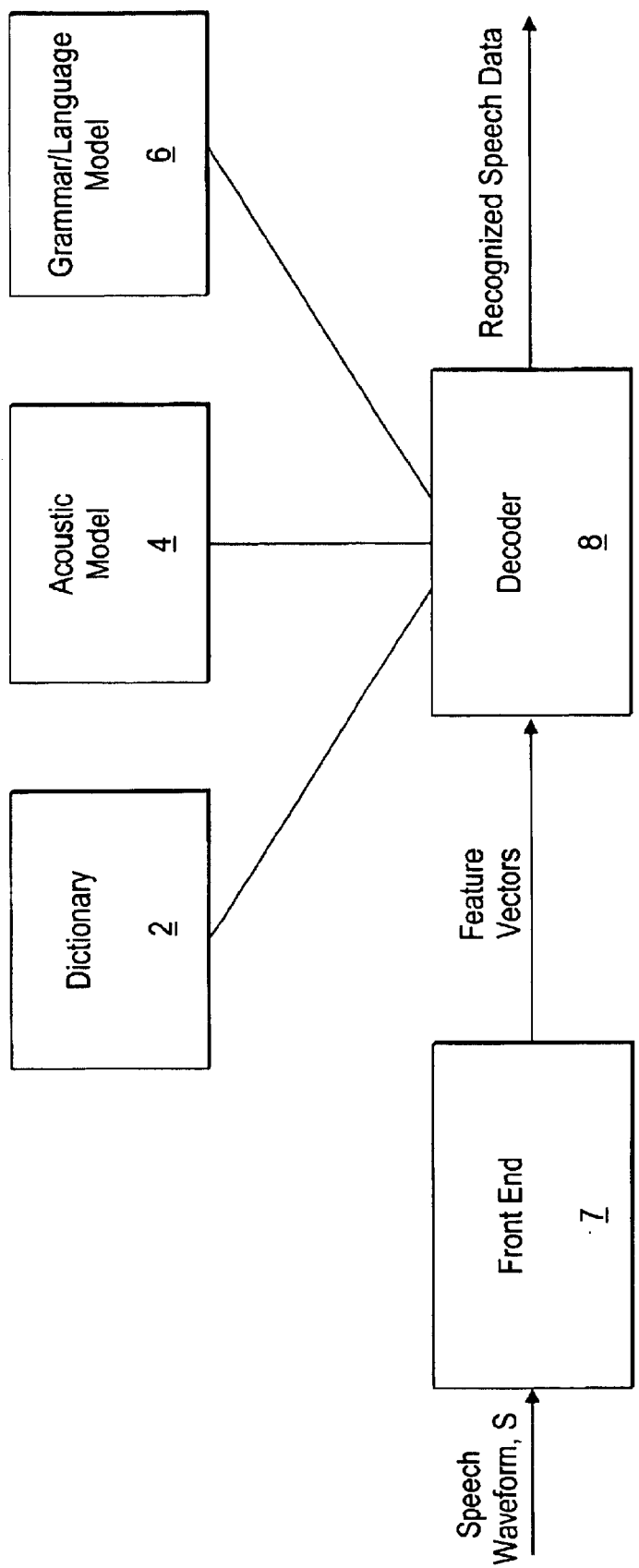
FIG. 1 is a block diagram of a speech recognition system.

FIG. 1 shows an example of a speech recognition system in which the present noise reduction technique can be implemented, to provide advantages over prior art speech recognition systems. It should be noted, however, that the described noise reduction technique is not limited to use in speech recognition systems, nor is it limited in application to speech signals or to any particular type of signal. The illustrated system includes a dictionary 2, a set of acoustic models 4, and a grammar/language model 6. Each of these elements may be stored in one or more conventional memory devices. The dictionary 2 contains all of the words allowed by the speech application in which the system is used. The acoustic models 4 are statistical representations of all phonetic units and subunits of speech that may be found in a speech waveform. The grammar/language model 6 is a statistical or deterministic representation of all possible combinations of word sequences that are allowed by the speech application. The system further includes an audio front end 7 and a speech decoder 8.

An input speech waveform is received by the audio front end 7 via a microphone, telephony interface, computer network interface, or other appropriate interface. The audio front end 7 digitizes the speech waveform and extracts feature vectors (also known as features or observations) from digitized speech. The audio front end 7 is essentially responsible for processing the speech waveform and transforming it into a sequence of data points that can be better modeled by the acoustic models 4 than the raw waveform. The extracted feature vectors are provided to the speech decoder 8, which references the feature vectors against the dictionary 2, the acoustic models 4, and the grammar/language model 6, to generate recognized speech data. The recognized speech data may further be provided to a natural language interpreter (not shown), which interprets the meaning of the recognized speech.

The noise reduction technique described herein may be implemented within the audio front end 7. Note that audio front ends which perform the above functions but without the noise reduction technique described herein are well known in the art. The noise reduction technique may be implemented using software, hardware, or a combination of hardware and software. For example, the noise reduction technique may be implemented by a microprocessor or Digital Signal Processor (DSP) executing sequences of software instructions. Alternatively, the technique may be implemented using only hardwired circuitry, or a combination of hardwired circuitry and executing software instructions. Such hardwired circuitry may include, for example, one or more microcontrollers, Application Specific Integrated Circuits (ASICs), Programmable Logic Devices (PLDs), Field Programmable Gate Arrays (FPGAs), or other suitable components.

Figure 2:
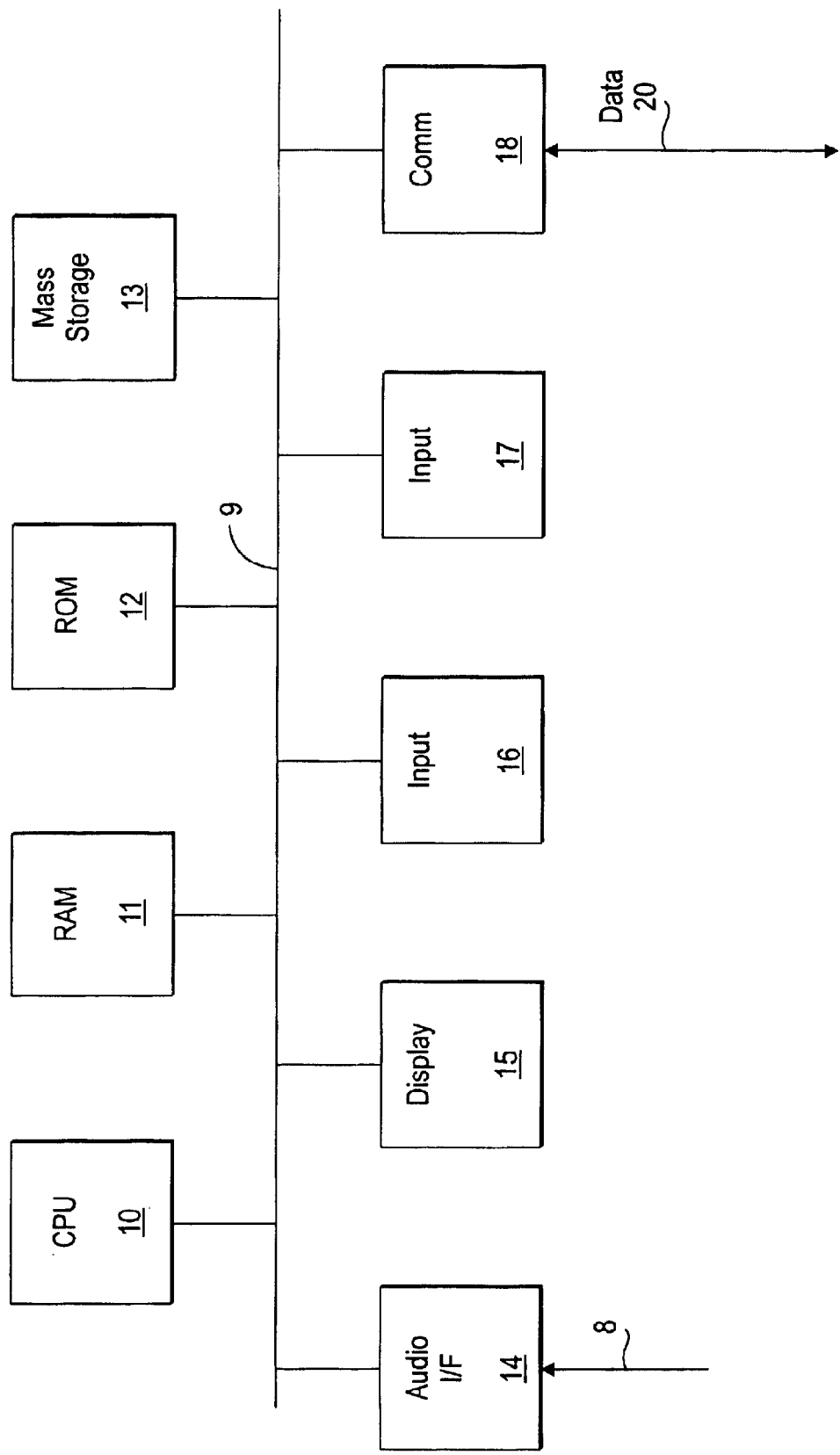
FIG. 2 is a block diagram of a computer system.

The system of FIG. 1 may be implemented in one or more conventional computer systems, such as a personal computer (PC), workstation, etc. That is, the system may be implemented in a single computer system, or it may be distributed over multiple computer systems, which may be connected on a network. FIG. 2 illustrates an example of such computer system at a high-level. The computer system of FIG. 2 includes a central processing unit (CPU) 10 (e.g., a microprocessor), random access memory (RAM) 11, read-only memory (ROM) 12, and a mass storage device 13, each connected to a bus system 9. Mass storage device 13 may include any suitable device for storing large volumes of data, such as magnetic disk or tape, magneto-optical (MO) storage device, or any of various types of Digital Versatile Disk (DVD) or compact disk ROM (CD-ROM) storage, flash memory etc. The bus system 9 may include one or more buses connected to each other through various bridges, controllers and/or adapters, such as are well-known in the art. For example, the bus system 9 may include a system bus that is connected through an adapter to one or more expansion buses, such as a Peripheral Component Interconnect (PCI) bus.

Also coupled to the bus system 9 are an audio interface 14, a display device 15, input devices 16 and 17, and a communication device 30. The audio interface 14 allows the computer system to receive an input audio signal 8 that includes the speech waveform. Hence, the audio interface 14 includes circuitry and/or software instructions for receiving an input audio signal which includes the speech signal, which may be received from a microphone, a telephone line, a network interface, etc., and for transferring such signal onto the bus system 9. The display device 15 may be any suitable device for displaying alphanumeric, graphical and/or video data to a user, such as a cathode ray tube (CRT), a liquid crystal display (LCD), or the like, and associated controllers. The input devices 16 and 17 may include, for example, a conventional pointing device, a keyboard, etc. The communication device 18 may be any device suitable for enabling the computer system to communicate data with another processing system over a network via a data link 20, such as a conventional telephone modem, a wireless modem, a cable modem, an Integrated Services Digital Network (ISDN) adapter, a Digital Subscriber Line (xDSL) adapter, an Ethernet adapter, or the like.

Note that some of these components may not be present certain embodiments, and certain embodiments may include additional or substitute components that are not mentioned here. Such variations will be readily apparent to those skilled in the art. As an example of such a variation, the audio interface 14 and the communication device 18 may be implemented as a single device in certain embodiments. As another example, the peripheral components connected to the bus system 9 might further include audio speakers and associated adapter circuitry.

Figure 3:
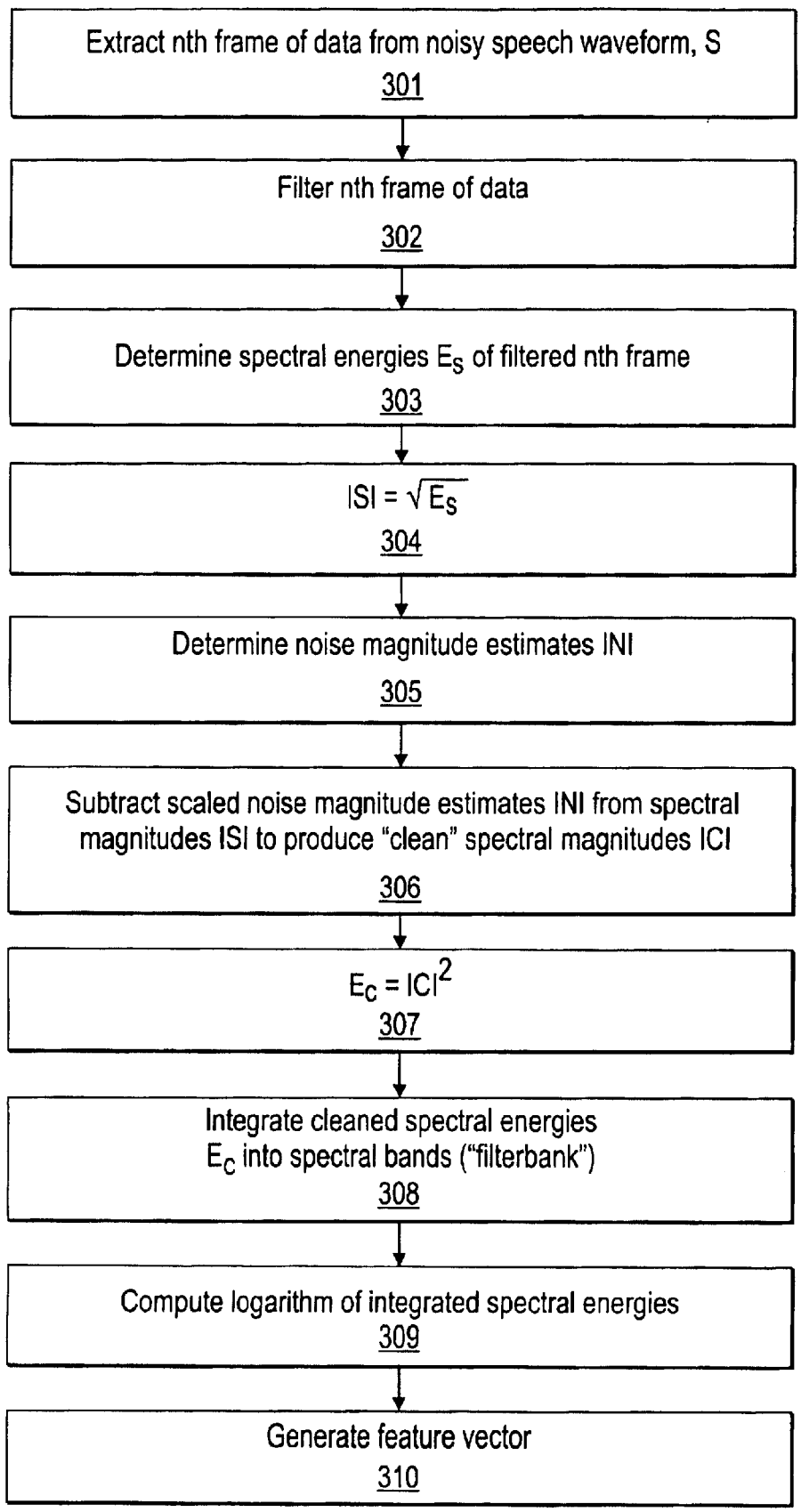
FIG. 3 is a flow diagram showing an overall process for extracting feature vectors from an input speech waveform.

FIG. 3 shows an overall process that may be implemented by the audio front-end 7 in the processing of a speech waveform, including the removal of noise, according to one embodiment. The noisy speech waveform S is first divided into a series of partially overlapping portions, or "frames". The process of FIG. 3 is then performed on each frame of data. First, at block 301, the nth frame of data is extracted from the input speech waveform S. The frame of data is then filtered at block 302 using a conventional filtering technique. Next, a spectral analysis is applied to the filtered nth frame of data. The results of the spectral analysis are a set of values that represent the frequency content of that frame of data in terms of spectral energies. Specifically, at block 303 the spectral energies $E_s$ of the nth frame are determined. A spectral energy value $E_s$ can be computed as the sum of the squares of the real and imaginary components of the Fourier transform of the noisy speech signal S. At block 304, the square roots of the energies $E_s$ are computed to obtain the spectral magnitudes |S| of the noisy speech signal S. A noise magnitude estimate |N| is then determined at block 305 for each of the spectral magnitudes |S|. At block 306, the noise magnitude estimates |N| are scaled and subtracted from the corresponding spectral magnitudes |S| to produce "clean" (reduced-noise) spectral magnitudes |C|. The clean spectral magnitudes |C| are squared at block 307 to produce the clean spectral energies $E_c$. The clean spectral energies $E_c$ are then integrated at block 308 into several (e.g. 20) frequency bands in a filterbank. At block 309, the logarithm of the integrated spectral energies is computed, and at block 310, further processing is performed based on the logarithm of the integrated spectral energies, in a manner well known in the art, to generate a feature vector.

The noise reduction technique described herein acts upon the spectral amplitudes, but leaves the rest of the audio front end unchanged. More specifically, if the speech waveform is noisy, then the spectral energies are affected by this noise. These noisy spectral energies produce noisy features, which will tend to degrade speech recognition. The technique described herein computes an estimate of the noise that is present in the spectral amplitudes and subtracts this estimate from the noisy spectral magnitudes (blocks 305 and 306 in FIG. 3). The resulting spectral magnitudes are cleaner (less noisy) and more easily decoded by the speech recognition system.

Figure 4:
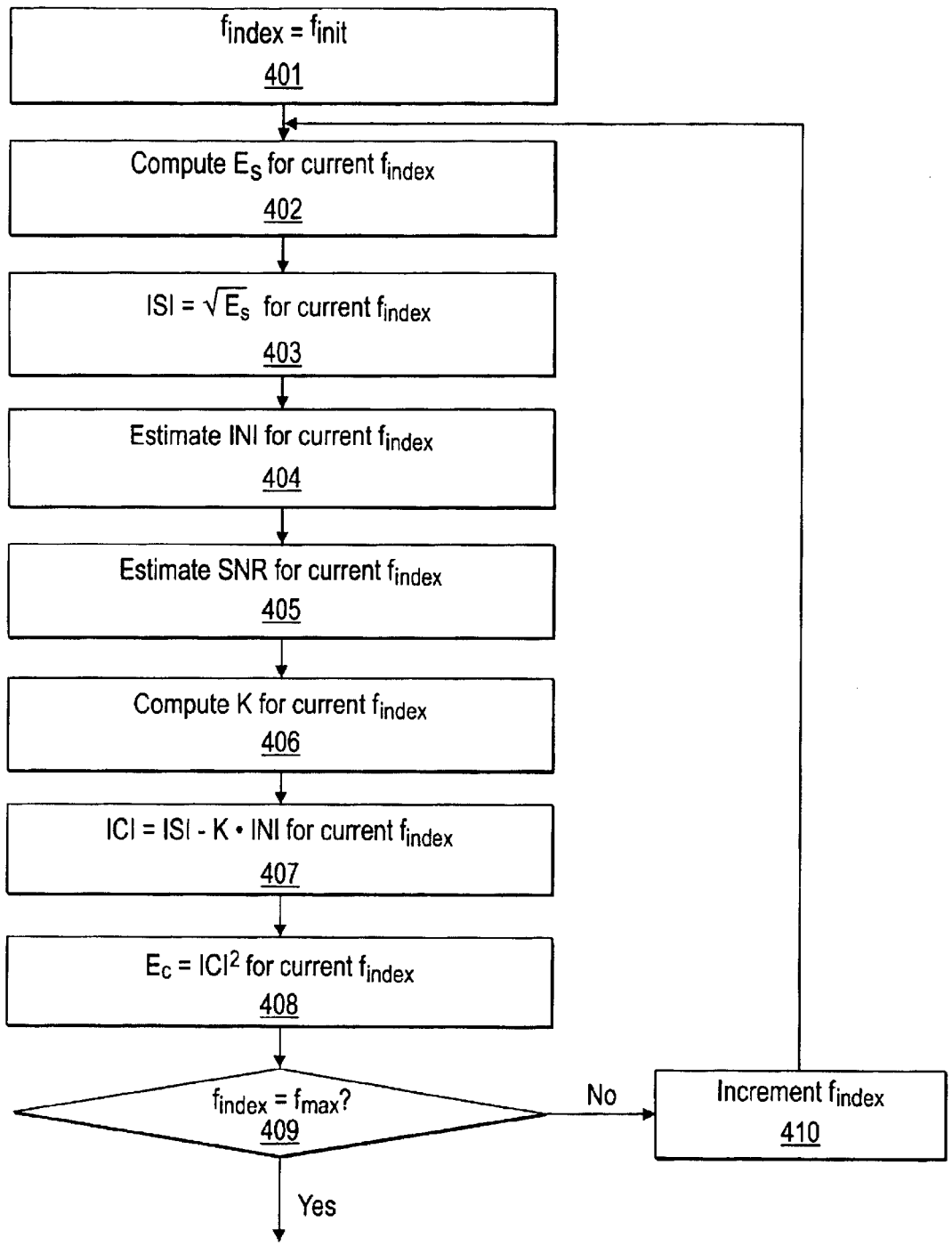
FIG. 4 is a flow diagram showing a process for removing noise from a speech signal.

FIG. 4 illustrates the noise removal process in greater detail, according to one embodiment. At block 401, a frequency index $f_{index}$ is initialized to the first frequency bin, $f_{init}$. At block 402, the spectral energy $E_s$ of the noisy speech signal S is computed for the current frequency index. The spectral energy $E_s$ can be computed as the sum of the squares of the real and imaginary components of the Fourier transform of the noisy speech signal S. At block 403, the magnitude |S| of the noisy speech signal S is computed for this frequency index as the square root of the spectral energy $E_s$. At block 404, the magnitude |N| of the noise for this frequency index is estimated. A process for estimating the magnitude |N| of the noise is described in greater detail below. The signal-to-noise ratio (SNR) for this frequency index is estimated as |S|/|N| for the current frequency index at block 405. At block 406, a scale factor K is computed for this frequency index. A process for computing the scale factor K is described in greater detail below. At block 407, the noise magnitude estimate |N| is multiplied by the corresponding scale factor K for this frequency index, and the resulting quantity (the scaled noise magnitude estimate) is subtracted from the spectral magnitude |S| for this frequency index, to produce a clean spectral magnitude |C|. That is, the clean spectral magnitude |C| is computed as |C|=|S|−K·|N|. The clean spectral magnitude |C| is then squared at block 408 to produce a clean spectral energy value $E_c$ for this frequency index. If the frequency index $f_{index}$ does not equal the highest frequency bin, $f_{max}$, i.e., there are additional frequency indexes $f_{index}$ to process for this frame (block 409), then the frequency index $f_{index}$ is incremented at block 410, and the process repeats from block 402. Otherwise, the process exits. Note that the total number of frequency indexes $f_{index}$ may be quite large, e.g., on the order of 100 or more $f_{index}$ values may be desirable.

Figure 5:
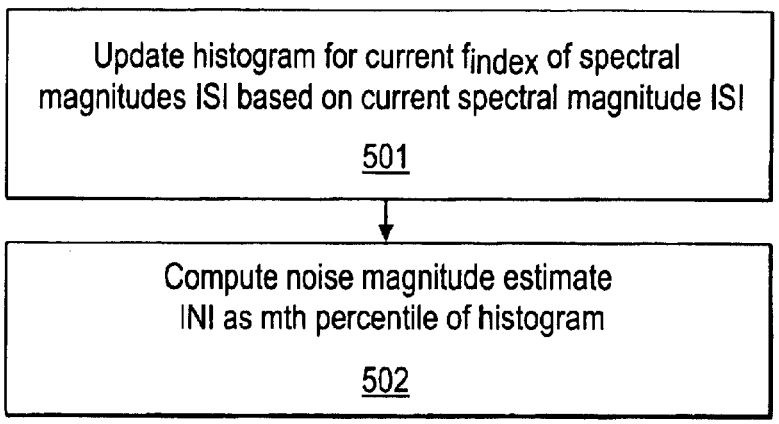
FIG. 5 is a flow diagram showing a process for generating a noise magnitude estimate.

FIG. 5 shows in greater detail a process for determining the noise magnitude estimate |N|. The noise magnitude |N| is estimated in the foregoing process by computing a histogram of the observed spectral magnitudes |S| and then taking the value of a predetermined low percentile (e.g. the 18th percentile) of the histogram as the estimate of the noise magnitude |N|. A separate histogram is maintained for each frequency index. Thus, at block 501 the histogram for the current frequency index $f_{index}$ is updated based on the current spectral magnitude |S|. At block 502, the noise magnitude estimate |N| is determined as the mth percentile of the histogram, where m is a predetermined number. Note that the computation of the noise estimate |N| is done in the magnitude domain, as is the computation of the SNR. As a result, the spectral subtraction (blocks 306 and 407) is also performed in the magnitude domain, in contrast with certain prior art noise reduction techniques which subtract noise in the energy domain.

The scale factor K is an important feature of the present noise reduction process, which contributes to its ability to operate well on either noisy speech or clean speech. The scale factor K is a function of the absolute level of the noise spectrum, the SNR, time, and frequency. As described further below, the scale factor K is computed such that the noise magnitude estimate |N| tends to be scaled down to a greater extent for a relatively low-noise speech signal and to a lesser extent for a noisy speech signal. More specifically, the scale factor K is computed as a function of the product of a noise scale factor $K_N$ and a SNR scale factor $K_{SNR}$.

The noise scale factor $K_N$ for a given frequency index is based on a sigmoid function of the noise magnitude estimate |N| for that frequency index. Similarly, the SNR scale factor $K_{SNR}$ for a given frequency index is based on a sigmoid function of the estimated SNR for that frequency index. For purposes of this description, a sigmoid function is a smooth, symmetrical non-linear function that asymptotically tends to −1 for very small arguments and asymptotically tends to 1 for very large arguments. In this context, therefore, the sigmoid of an arbitrary variable x may be defined according to the following formula:

$$\text{sigmoid}(x) = (e^x - e^{-x})/(e^x + e^{-x})$$

The noise scale factor $K_N$ is defined to have a range of 0 to 1.0, with $K_N$ increasing as |N| increases. Thus, the noise scale factor $K_N$ has a value of 0 when the noise magnitude estimate |N| (is small and a value of 1.0 when the noise magnitude estimate is large. The SNR scale factor $K_{SNR}$ is also defined to have a range from 0 to 1.0, but with $K_{SNR}$ decreasing as SNR increases. Hence, the SNR scale factor $K_{SNR}$ is defined to have a value of 0 when the SNR estimate is large and a value of 1.0 when the SNR estimate is small.

Figure 6:
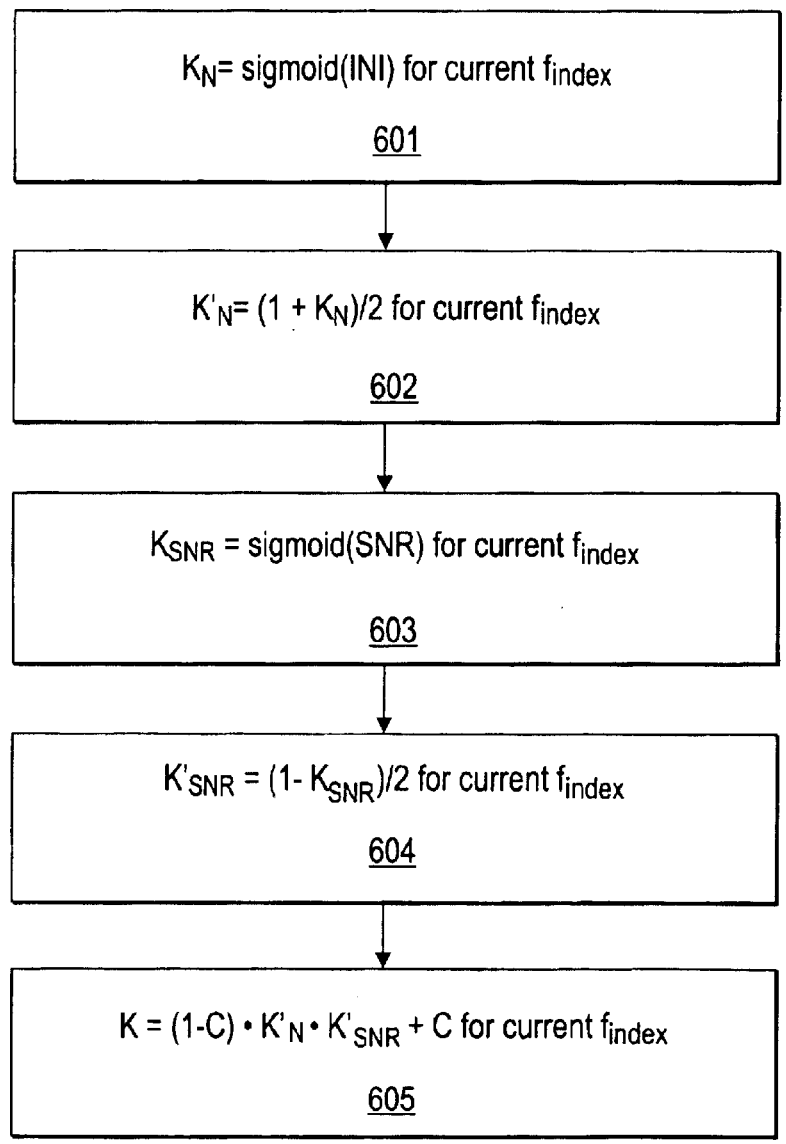
FIG. 6 is a flow diagram showing a process for computing a scale factor for a noise estimate.

FIG. 6 illustrates a process for computing the overall noise scale factor K. At block 601, the noise scale factor $K_N$ is computed for the current frequency index based on the corresponding noise magnitude estimate |N|, as $K_N$=sigmoid(|N|). At block 602, $K_N$ is modified to have a range of 0 to 1.0 according to the equation $K'_N=(1+K_N)/2$. At block 603, the SNR scale factor $K_{SNR}$ is computed for the current frequency index based on the corresponding SNR, as $K_{SNR}$=sigmoid(SNR). At block 604, $K_{SNR}$ is modified to have a range of 0 to 1.0 according to the equation $K'_{SNR}=(1-K_{SNR})/2$. At block 605, the overall scale factor K is computed as $K=(1-C)\cdot K'_N \cdot K'_{SNR}+C$, where C is a constant between 0 and 1.0. The specific value of C depends upon the application in which the process is used and the specific system response that is desired.

The two sigmoids (for $K_N$ and $K_{SNR}$) can be parameterized to adjust exactly when and how abruptly each function changes from −1 to 1. For example, rather than using a sigmoid function of the noise magnitude estimate |N| in the form of sigmoid(x), one may instead use a parameterized sigmoid function of the form sigmoid(Ax+B). The specific values of the parameters A and B also depend upon the application and the desired response. It may be desirable to select values for these parameters which work over a wide range of acoustic conditions. However, recognition may be improved by restricting application of the present technique to certain types of acoustic data and selecting the values of A and B accordingly.

When the scale factor K is computed as described above, the following results are observed in the noise reduction process. When the SNR is small and the noise level is high, the overall scale factor K approaches 1.0. The noise estimate is fully subtracted from the spectral magnitudes of the noisy speech if and only if the SNR is small and the noise level is large. This is the result of the noise reduction process when the speech waveform is highly corrupted by noise. In contrast, when the SNR is high or the noise level is low, the overall scale factor K approaches a small value (close to 0). As a result, a very small fraction of the noise estimate is subtracted from the spectral energies. This is the result of the noise reduction process when the speech waveform is relatively uncorrupted by noise. Note that if both the noise scale factor $K_N$ and the SNR scale factor $K_{SNR}$ were set to 1.0 for all frequencies and for all timeframes, the recognition performance would improve in noise but worsen on clean speech. Thus, the present noise reduction technique operates well on both noisy speech and clean speech, in contrast with prior art noise reduction techniques.

It should also be noted that, because the overall scale factor K is a function of frequency, more noise can be subtracted from those frequency components that have a low SNR than those that have a higher SNR. Further, the fact that the scale factor K is a function of the absolute noise level is advantageous for at least two reasons. First, at the beginning of a speech signal (e.g., the beginning of a sentence), few samples are available and an accurate calibration of the SNR may not yet be available. In the present technique, however, the noise value that is subtracted at the beginning of the speech waveform is determined primarily by the absolute noise level, not the SNR. Consequently, the technique can be implemented as a real-time method of reducing noise, which begins the noise reduction process immediately when the speech signal becomes available, thereby reducing undesirable delay between production of the speech signal and its understanding by a speech recognizer. Second, the noise scale factor $K_N$ and the SNR scale factor $K_{SNR}$ can be set so as to avoid distortion of the spectrum of very clean speech signals.

Thus, a method and apparatus for reducing noise in a speech signal have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method of reducing noise in data representing a speech signal, the method comprising:

inputting the data representing a speech signal;

for each of a plurality of frequency components of the speech signal, computing a first scale factor as a function of an absolute noise level of noise associated with the speech signal such that the first scale factor is not a function of the speech signal, and computing a second scale factor as a function of a signal-to-noise ratio associated with the speech signal, wherein the first scale factor and the second scale factor are each based on a sigmoid function;

for each of the plurality of frequency components of the speech signal, computing a noise scale factor from both the first scale factor and the second scale factor;

for each of the plurality of frequency components of the speech signal, scaling a measure of noise in the speech signal by the corresponding noise scale factor; and for each of the plurality of frequency components, subtracting noise from the data based on the corresponding scaled measure of noise.

2. A method as recited in claim 1, wherein the noise scale factor is defined such that:

the noise scale factor has a first value if the absolute noise level is high while the signal-to-noise ratio is low, and the noise scale factor has a second value lower than the first value if either the absolute noise level is low or the signal-to-noise ratio is high.

3. A method as recited in claim 1, wherein the noise scale factor K is defined based substantially on the formula:

$$K = K'_N \cdot K'_{SNR},$$

wherein $K'_N$ is the first scale factor, the size of which increases within a range of values as the absolute noise level increases; and $K'_{SNR}$ is the second scale factor, the size of which decreases within said range of values as the signal-to-noise ratio increases.

4. A method as recited in claim 1, wherein the noise scale factor is defined such that during an initial stage of said removing, the noise scale factor is influenced primarily by the absolute noise level and not the signal-to-noise ratio.

5. A method of generating a noise-reduced feature vector representing human speech, the method comprising:

receiving speech data representing an input speech waveform;

determining a plurality of spectral energies of the speech data;

removing noise in the input speech waveform by, for each of a plurality of frequency components, computing a spectral magnitude, computing a noise magnitude estimate, determining a signal-to-noise ratio, computing an overall noise scale factor as a function of a first noise scale factor and a second noise scale factor, wherein the first noise scale factor is a function of an absolute noise level of noise associated with the speech signal but not a function of the speech signal, and wherein the second noise scale factor is a function of a signal-to-noise ratio associated with the speech signal, and wherein the first scale factor and the second scale factor are each based on a sigmoid function, scaling a noise magnitude estimate according to a product of the noise magnitude estimate and the overall noise scale factor, and modifying the spectral magnitude using the scaled noise magnitude estimate, to produce cleaned speech data; and generating a feature vector based on the cleaned speech data.

6. A method of generating a noise-reduced feature vector representing human speech, the method comprising:

receiving speech data representing an input speech waveform;

filtering the speech data;

determining a plurality of spectral energies of the filtered speech data;

removing noise in the input speech waveform based on the spectral energies by, for each of a plurality of frequency indexes computing a spectral magnitude for the frequency index based on the spectral energy for the frequency index;

computing a noise magnitude estimate for the frequency index by updating a histogram of spectral magnitude, and determining the noise magnitude estimate as a predetermined percentile of the histogram;

determining a signal-to-noise ratio for the frequency index;

computing a noise scale factor for the frequency index, including computing a first scale factor based on the signal-to-noise ratio, computing a second scale factor based on the noise magnitude estimate, and computing the noise scale factor as a function of the first scale factor and the second scale factor;

multiplying the noise magnitude estimate by the noise scale factor to produce a scaled noise magnitude estimate, and subtracting the scaled noise magnitude estimate from the spectral magnitude, to produce cleaned speech data; and generating a feature vector based on the cleaned speech data.

7. An apparatus for reducing noise in data representing an audio signal, the apparatus comprising:

means for inputting the data representing an audio signal;

means for computing, for each of a plurality of frequency components of the speech signal, a first scale factor as a function of an absolute noise level of noise associated with the speech signal and a second scale factor as a function of a signal-to-noise ratio associated with the speech signal, wherein the first scale factor and the second scale factor are each based on a sigmoid function;

means for computing, for each of the plurality of frequency components of the speech signal, a noise scale factor from both the first scale factor and the second scale factor;

means for scaling, for each of a plurality of frequency components of the audio signal, a measure of noise in the audio signal by the noise scale factor; and means for subtracting, for each of the plurality of frequency components, noise from the data based on the corresponding scaled measure of noise.

8. A speech recognition system comprising:

a dictionary model;

an acoustic model;

a grammar model;

front end circuitry configured to generate feature vectors based on input speech data in an input speech signal, the front end further configured to remove noise from the input speech data for purposes of generating the feature vectors by, computing a spectral magnitude of the speech data for each of a plurality of frequency components of the speech data, computing an estimate of noise in the data for each of the plurality of frequency components, computing a first noise scale factor as function of an absolute noise level of noise associated with the speech signal but not as a function of the speech signal, wherein the first scale factor is based on a sigmoid function, computing a second noise scale factor as a function of a signal-to-noise ratio associated with the speech signal, wherein the second scale factor is based on a sigmoid function, computing an overall noise scale factor as a function of the first noise scale factor and the second noise scale factor, scaling the estimate of noise by the overall scale factor to produce a scaled noise estimate, for each of the plurality of frequency components, subtracting the scaled noise estimate from the spectral magnitude to produce cleaned speech data for each of the plurality of frequency components, and generating the feature vectors based on the cleaned speech data;

a decoder configured to receive said one or more feature vectors and to output data representing recognized speech based on the feature vectors and contents of the dictionary model, the acoustic model, and the grammar model.

\* \* \* \* \*